(12) United States Patent
Johnson et al.

(10) Patent No.: US 8,664,951 B2
(45) Date of Patent: Mar. 4, 2014

(54) MEMS GYROSCOPE MAGNETIC SENSITIVITY REDUCTION

(75) Inventors: Burgess R. Johnson, Bloomington, MN (US); Bharat Pant, Minneapolis, MN (US)

(73) Assignee: Honeywell International Inc., Morristown, NJ (US)

(*) Notice: Subject to any disclaimer, the term of this patent is extended or adjusted under 35 U.S.C. 154(b) by 955 days.

(21) Appl. No.: 12/723,964

(22) Filed: Mar. 15, 2010

(65) Prior Publication Data
US 2010/0244819 A1    Sep. 30, 2010

Related U.S. Application Data

(60) Provisional application No. 61/164,662, filed on Mar. 30, 2009.

(51) Int. Cl.
*G01R 33/02* (2006.01)

(52) U.S. Cl.
USPC .......... 324/244; 324/318; 73/504.16; 438/50; 702/94

(58) Field of Classification Search
USPC ........... 324/244, 318; 73/504.16; 438/50; 356/459; 702/94
See application file for complete search history.

(56) References Cited

U.S. PATENT DOCUMENTS

| | | | |
|---|---|---|---|
| 5,723,790 A | 3/1998 | Andersson | |
| 5,747,690 A * | 5/1998 | Park et al. | 73/504.12 |
| 5,837,895 A * | 11/1998 | Fujimoto | 73/504.12 |
| 5,911,156 A * | 6/1999 | Ward et al. | 73/504.16 |
| 5,932,804 A * | 8/1999 | Hopkin et al. | 73/504.13 |
| 5,992,233 A | 11/1999 | Clark | |
| 6,250,156 B1 | 6/2001 | Seshia et al. | |
| 6,257,059 B1 | 7/2001 | Weinberg et al. | |
| 6,536,281 B2 * | 3/2003 | Abe et al. | 73/504.16 |
| 6,718,823 B2 * | 4/2004 | Platt | 73/504.12 |
| 6,860,151 B2 | 3/2005 | Platt et al. | |

(Continued)

FOREIGN PATENT DOCUMENTS

| | | |
|---|---|---|
| EP | 1855086 | 11/2007 |
| JP | 2003510573 | 3/2003 |

(Continued)

OTHER PUBLICATIONS

Sternberg et al., "Qualification Process for MEMS Gyroscopes for the use in Navigation Systems", "The 5th International Symposium on Mobile Mapping Technology", May 29-31, 2007, Publisher: ISPRS.

(Continued)

*Primary Examiner* — Jermele M Hollington
*Assistant Examiner* — Temilade S Rhodes-Vivour
(74) *Attorney, Agent, or Firm* — Fogg & Powers LLC

(57) ABSTRACT

A tuning fork gyroscope that is insensitive to magnetic field gradients is provided. The tuning fork gyroscope includes a first electrically conducting proof mass and a second electrically conducting proof mass connected through electrically conducting suspensions to anchors attached to one or more insulating substrates, and an electrical-resistance mid-point electrically connected to opposing ends of the first electrically conducting proof mass and to opposing ends of the second electrically conducting proof mass. The tuning fork gyroscope provides an input to a sense charge amplifier. The sense charge amplifier generates an output signal indicative of a rotation of the tuning fork gyroscope. The output signal is independent of a magnetic field gradient.

22 Claims, 12 Drawing Sheets

(56) References Cited

U.S. PATENT DOCUMENTS

| | | | |
|---|---|---|---|
| 7,036,373 B2 | 5/2006 | Johnson et al. | |
| 7,359,059 B2 * | 4/2008 | Lust et al. | 356/459 |
| 7,394,245 B2 * | 7/2008 | Brunson et al. | 324/244 |
| 8,187,902 B2 * | 5/2012 | Weinberg et al. | 438/50 |
| 2001/0011479 A1 | 8/2001 | Takeuchi et al. | |
| 2003/0200803 A1 * | 10/2003 | Platt | 73/504.02 |
| 2009/0058232 A1 | 3/2009 | Takahashi | |
| 2009/0223276 A1 | 9/2009 | Rudolf et al. | |
| 2009/0255336 A1 | 10/2009 | Horning et al. | |

FOREIGN PATENT DOCUMENTS

| | | |
|---|---|---|
| JP | 2005524093 | 8/2005 |
| JP | 2007108072 | 4/2007 |
| JP | 2007304099 | 11/2007 |
| JP | 2008096441 | 4/2008 |

OTHER PUBLICATIONS

European Patent Office, "Office Action", "from Foreign Counterpart of U.S. Appl. No. 12/723,964", Jul. 12, 2010, pp. 1-3, Published in: EP.

European Patent Office, "Communication Under Rule 71(3) EPC", "from Foreign Counterpart of U.S. Appl. No. 12/723,964", Aug. 18, 2011, pp. 1-6, Published in: EP.

European Patent Office, "European Search Report", Jul. 2, 2010, Published in: EP.

Japanese Patent Office, "Office Action", "from Foreign Counterpart of U.S. Appl. No. 12/723,964", Nov. 28, 2013, pp. 1-6, Published in: JP.

* cited by examiner

MEMS GYROSCOPE MAGNETIC SENSITIVITY REDUCTION

This application claims the benefit of U.S. Provisional Application No. 61/164,662, filed on Mar. 30, 2009, which is incorporated herein by reference in its entirety.

BACKGROUND

A tuning fork vibratory micro-electrical-mechanical system (MEMS) gyroscope can be sensitive to magnetic field gradients, due to the electromotive force (emf) induced by motor motion of the proof masses in the magnetic field gradient. It is desirable for a MEMS gyroscope to be insensitive to magnetic fields, to minimize errors in measuring rotation rate, and so that permeable magnetic materials can be used in packaging the MEMS gyroscope.

SUMMARY

The present application relates to a tuning fork gyroscope that is insensitive to magnetic field gradients. The tuning fork gyroscope includes a first electrically conducting proof mass and a second electrically conducting proof mass connected through electrically conducting suspensions to anchors attached to one or more insulating substrates, and an electrical-resistance mid-point electrically connected to opposing ends of the first electrically conducting proof mass and to opposing ends of the second electrically conducting proof mass. The tuning fork gyroscope provides an input to a sense charge amplifier. The sense charge amplifier generates an output signal indicative of a rotation of the tuning fork gyroscope. The output signal is independent of a magnetic field gradient.

DRAWINGS

Like reference numbers and designations in the various drawings indicate like elements.

DETAILED DESCRIPTION

Figure 1A:
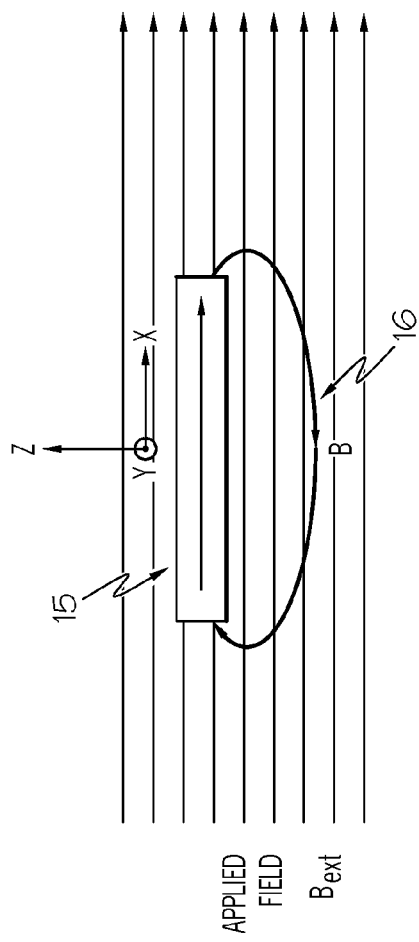
FIG. 1A shows an exemplary permeable magnetic material in an applied external magnetic field with an induced magnetic field.
Figure 1B:
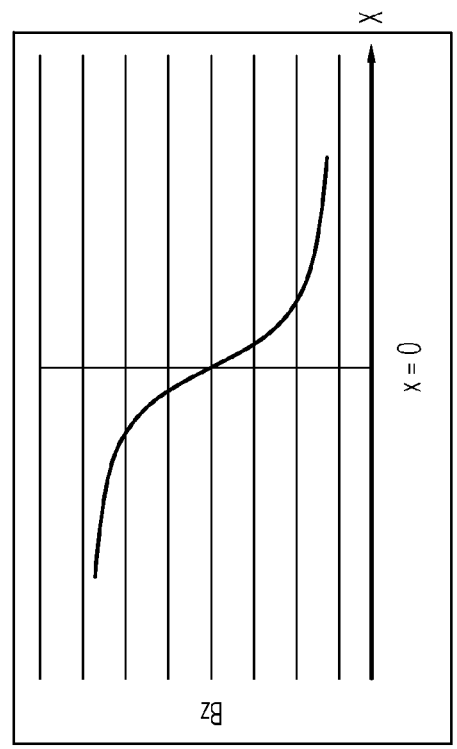
FIG. 1B shows the gradient of the total magnetic field of FIG. 1A in the Z direction as a function of position on the X axis.

Currently available tuning fork gyroscopes are sensitive to magnetic field gradients. If a permeable magnetic material is near a gyroscope sensor or within the gyroscope package, a uniform applied magnetic field can magnetize the permeable material, which can, in turn, produce a magnetic field gradient $dB_z/dx$ at the gyroscope sensor. FIG. 1A shows an exemplary permeable magnetic material 15 in an applied external magnetic field $B_{ext}$ (indicated by the parallel arrows) with an induced magnetic field B (indicated by curved arrow B). FIG. 1B shows the gradient of the total magnetic field of Figure A in the Z direction $B_z$ as a function of position on the X axis. The sensitivity of the gyroscope sensor to the magnetic field gradient $dB_z/dx$ is exacerbated in smaller gyroscopes, such as tuning fork vibratory micro-electrical-mechanical system (MEMS) gyroscopes.

In some cases, tuning fork MEMS gyroscopes include permeable magnetic material in the packaging. For example, Kovar is a permeable magnetic material that has an advantageous low thermal expansion and robust mechanical properties. Therefore, Kovar is used in packages for tuning fork MEMS gyroscopes, for related electronics, and for glass-to-metal seals. A tuning fork MEMS gyroscope package containing a permeable magnetic material (e.g., Kovar) is liable to generate a magnetic field gradient $dB_z/dx$ at the tuning fork sensor mechanism in the presence of a uniform applied magnetic field, as shown in FIGS. 1A and 1B.

Figure 8:
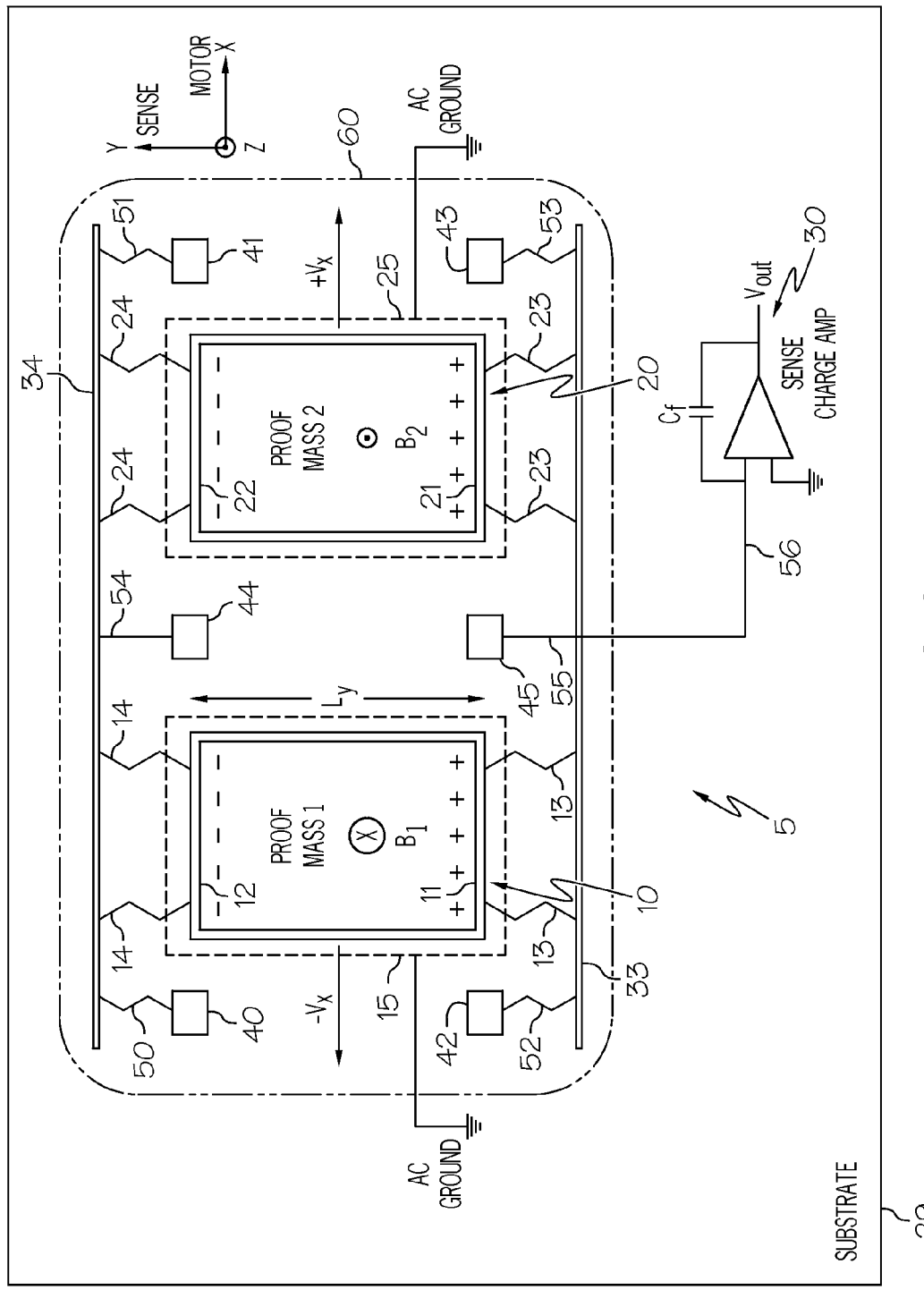
FIG. 8 is a block diagram of a prior art tuning fork MEMS gyroscope.

FIG. 8 is a block diagram of a prior art tuning fork MEMS gyroscope 5. For the prior art tuning fork MEMS gyroscope 5, the magnetic field gradient $dB_z/dx$ produces an output signal $V_{out}$ at a sense charge amplifier 30 as the conductive proof masses move in the magnetic field gradient $dB_z/dx$. The output signal $V_{out}$ results in an undesirable bias shift that can vary with the magnetic environment of prior art tuning fork MEMS gyroscopes 5. The bias shift can vary in an irreproducible fashion if there is hysteresis in the magnetization of permeable magnetic materials in or near the tuning fork MEMS gyroscope package. The magnetic-field-gradient induced bias at the sense charge amplifier 30 results in an erroneous and/or inconsistent output in prior art tuning fork MEMS gyroscopes 5.

A tuning fork gyroscope includes a first electrically conducting proof mass and a second electrically conducting proof mass that are connected through electrically conducting suspensions to anchors attached to one or more insulating substrates. The first electrically conducting proof mass and the second electrically conducting proof mass acquire a potential difference due to the induced emf. In embodiments described herein, the sensitivity of a tuning fork gyroscope to a magnetic field gradient $dB_z/dx$ is substantially reduced or eliminated by electrically connecting an electrical-resistance mid-point to opposing ends of the first electrically conducting proof mass and to opposing ends of the second electrically conducting proof mass. As defined herein, an electrical-resistance mid-point is that point where the electrical resistances of the connections from opposing ends of the first electrically conducting proof mass are equal to each other and to the electrical resistances of the connections from opposing ends of the second electrically conducting proof mass. In one embodiment, the electrical-resistance mid-point is provided at a point on a low-resistance stationary electrical connection between anchors at the two ends of the tuning fork gyroscope proof masses.

Figure 1C:
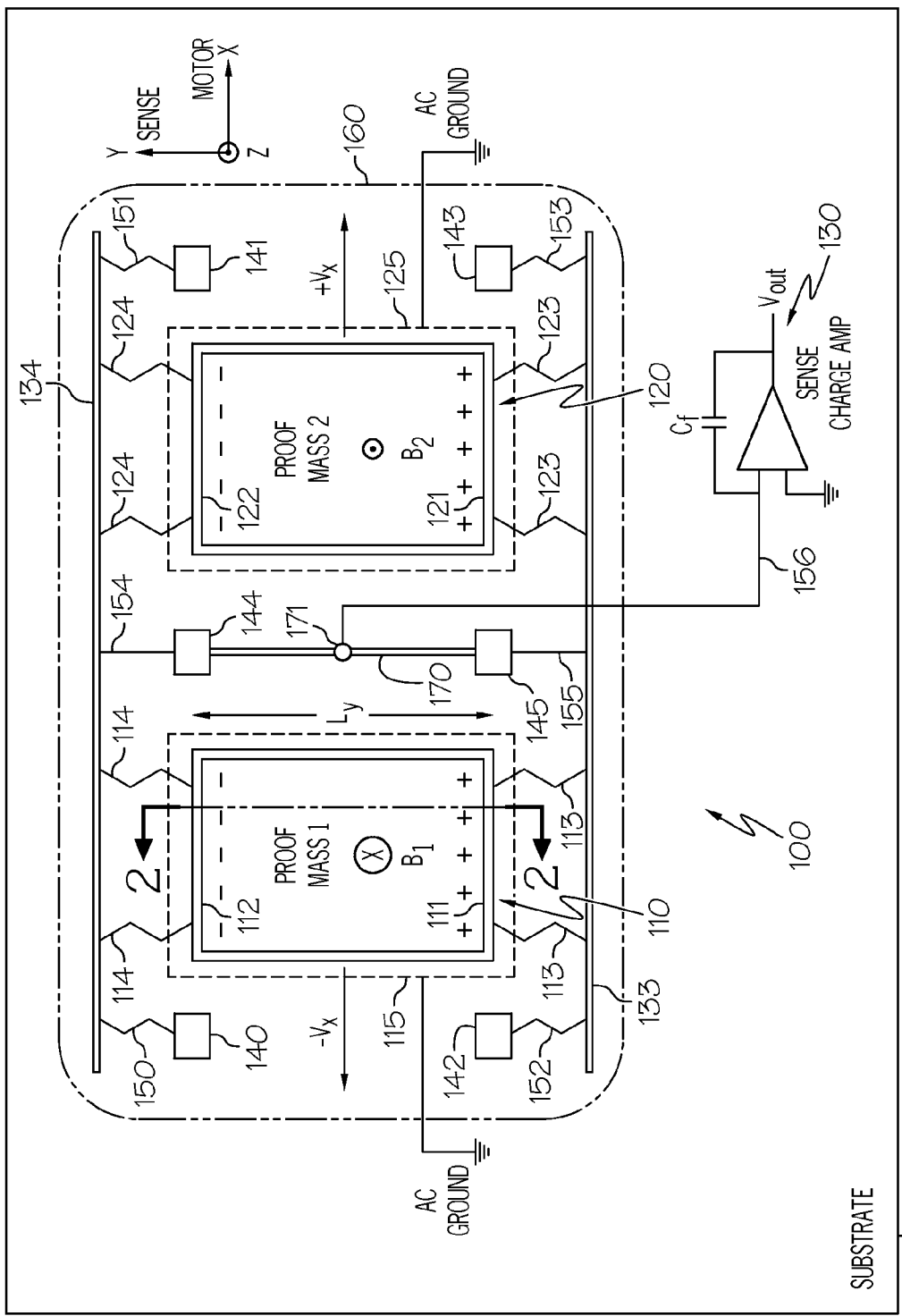
FIG. 1C is a block diagram of one embodiment of tuning fork MEMS gyroscope in accordance with the present invention.
Figure 2:
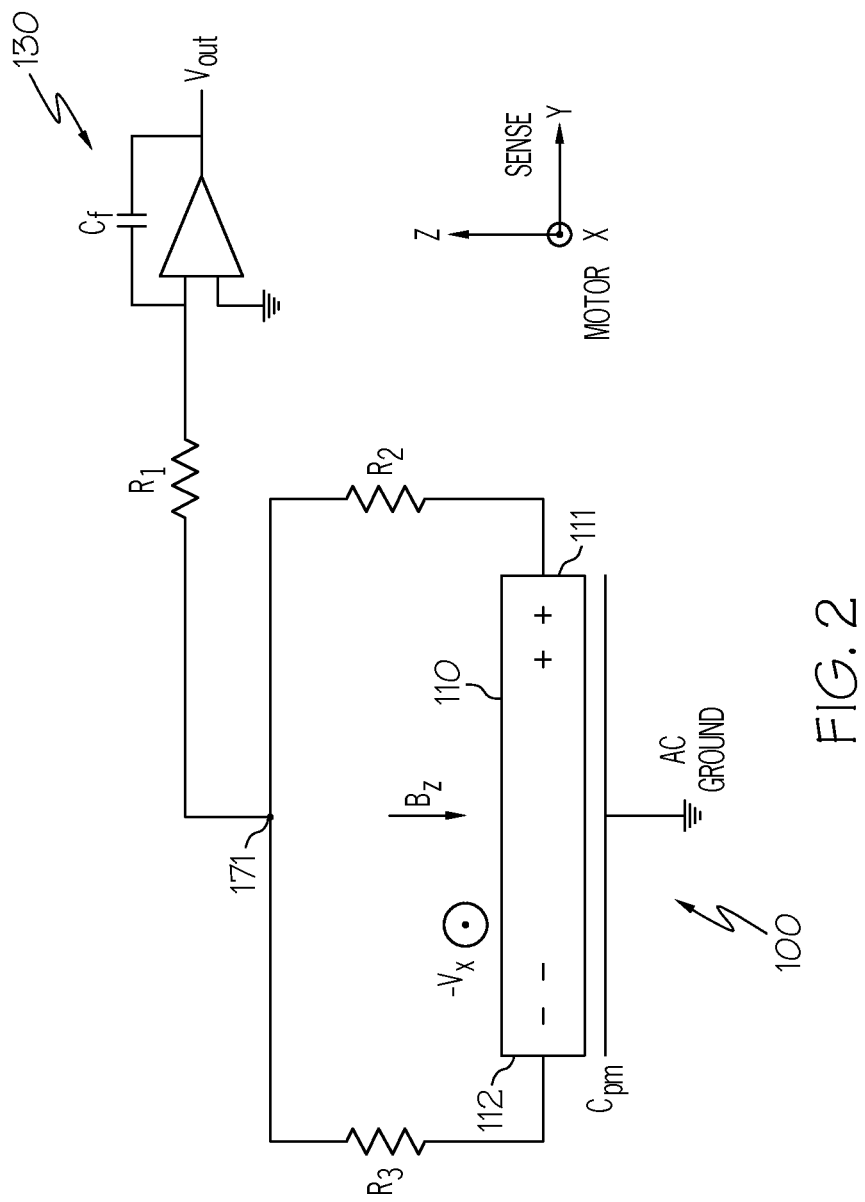
FIG. 2 is a cross-section view of the tuning fork MEMS gyroscope of FIG. 1C with a conceptual illustration of the connection to a sense charge amplifier.

FIG. 1C is a block diagram of one embodiment of tuning fork gyroscope 100 in accordance with the present invention. FIG. 2 is a cross-section view of the tuning fork gyroscope 100 of FIG. 1C with a conceptual illustration of the connection to a sense charge amplifier 130. The plane upon which the cross-section view of FIG. 2 is taken is indicated by section line 2-2 in FIG. 1C. In one implementation of this embodiment, the tuning fork gyroscope 100 is a tuning fork micro-electrical-mechanical system (MEMS) gyroscope 100. The tuning fork gyroscope 100 is also referred to herein as "gyroscope 100" and "MEMS gyroscope 100."

As shown in FIG. 1C, the tuning fork gyroscope 100 is positioned in the exemplary magnetic field gradient $dB_z/dx$ shown in FIGS. 1A and 1B. The Z-component of magnetic field $B_1$ is shown to be incident on a first electrically conducting proof mass 110. The Z-component of magnetic field $B_2$ is shown to be incident on a second electrically conducting proof mass 120.

The tuning fork gyroscope 100 includes the first electrically conducting proof mass 110 and the second electrically conducting proof mass 120. The electrical-resistance mid-point 171 in FIG. 1C is the point where the electrical resistance of the connection from end 112 of the first electrically conducting proof mass 110 equals the electrical resistance of the connection from end 111 of the first electrically conducting proof mass 110, which equals the electrical resistance of the connection from end 122 of the second electrically conducting proof mass 120, which equals the electrical resistance of the connection from end 121 of the second electrically conducting proof mass 120.

The first and second electrically conducting proof masses 110 and 120 of the tuning fork MEMS gyroscope 100 are moving in motor mode (tuning fork resonant mode) along the X axis with opposing velocities $+v_x$ and $-v_x$. When a permeable magnetic material is near the MEMS gyroscope 100, or within the gyroscope package, as described above, a uniform applied magnetic field $B_{ext}$ can magnetize the permeable material 15 (FIG. 1A), which then produces a magnetic field gradient $dB_z/dx$ at the MEMS gyroscope sensor 100. Remnant magnetization in the permeable material can also produce a magnetic field gradient at the MEMS gyroscope sensor 100. The magnetic sensitivity of the tuning fork MEMS gyroscope 100 to the magnetic field gradient $dB_z/dx$ is substantially reduced or eliminated by providing an electrical-resistance mid-point 171 between the second ends 112 and 122 and first ends 111 and 121 of the proof masses 110 and 120, respectively, which acquire a potential difference due to the induced emf.

The two electrically conducting proof masses 110 and 120 are connected through electrically conducting suspensions 150-155, 113, 114, 123, and 124, a first suspension bar 133, and a second suspension bar 134 to electrically conducting anchors 140-145 that are attached to one or more insulating substrates 129. The "electrically conducting first and second proof masses 110 and 120" are also referred to herein as "first and second conductive proof masses 110 and 120."

Anchor 145 is a first mid-point stationary anchor 145. Anchor 144 is a second mid-point stationary anchor 144. A stationary electrical connection 170 is formed between the first mid-point stationary anchor 145 and the second mid-point stationary anchor 144. In the embodiment of FIG. 1C, the first mid-point stationary anchor 145 and the second mid-point stationary anchor 144 are positioned in a plane located midway between the two electrically conducting proof masses 110 and 120.

The electrically conducting suspensions 150-155, and 113, 114, 123, and 124 include electrically conducting anchor-suspensions 150-155 and electrically conducting proof-mass suspensions 113, 114, 123, 124. Each anchor-suspension 150-155 is mechanically attached at one end to a respective anchor 140-145. A first portion of the anchor-suspensions 152, 153, and 155 are mechanically attached at the other ends to the first suspension bar 133. A second portion of the anchor-suspensions 150, 151, and 154 are mechanically attached at the other ends to the second suspension bar 134. The anchor-suspension 155 is referred to herein as a first mid-point suspension 155. The anchor-suspension 154 is referred to herein as a second mid-point suspension 154. The mechanical attachments described herein provide electrical connection points between the mechanically attached components.

First proof-mass suspensions 113 mechanically and electrically connect the first end 111 of the first proof mass 110 to the first suspension bar 133. Second proof-mass suspensions 123 mechanically and electrically connect the first end 121 of the second proof mass 120 to the first suspension bar 133. Third proof mass suspensions 114 mechanically and electrically connect the second end 112 of the first proof mass 110 to the second suspension bar 134. Fourth proof-mass suspensions 124 mechanically and electrically connect the second end 122 of the second proof mass 120 to the second suspension bar 134.

The first mid-point suspension 155 mechanically and electrically connects the first mid-point stationary anchor 145 to the first suspension bar 133. The first mid-point stationary anchor 145 is electrically connected to the stationary electrical connection 170, so that the stationary electrical connection 170 is electrically connected to both the first end 111 of the first proof mass 110 and the first end 121 of the second proof mass 120.

The second mid-point suspension 154 mechanically and electrically connects the second mid-point stationary anchor 144 to the second suspension bar 134. The second mid-point stationary anchor 144 is electrically connected to the stationary electrical connection 170, so that the stationary electrical connection 170 is electrically connected to both the second end 112 of the first proof mass 110 and the second end 122 of the second proof mass 120.

The first conductive proof mass 110 and the second conductive proof mass 120 are suspended over the insulating substrate 129 by the proof-mass suspensions 113, 114, 123, 124, by the first suspension bar 133, by the second suspension bar 134, and by the anchor-suspensions 150-155. The two conductive proof masses 110 and 120, the proof-mass suspensions 113, 114, 123, 124, and suspension bars 133 and 134, and the anchor-suspensions 150, 151, 152, 153, 154, 155 and the insulating substrate 129 beneath the two conductive proof masses 110 and 120 are collectively referred to herein as the gyroscope sensor mechanism 160, which is driven into motion along a motor axis X at the frequency of the tuning fork resonant mode.

In operation, the suspended proof masses 110 and 120 move along a motor axis X at the frequency of the tuning fork resonant mode responsive to driving forces on the tuning fork MEMS gyroscope 100. The movement of the proof masses 110 and 120 causes the charges to flow into the communicatively coupled sense charge amplifier 130. The return path for this AC current is provided by capacitances, shown as $C_{pm}$ in FIG. 2, coupling the proof masses 110 and 120 to the AC ground, e.g., the sense capacitance, drive capacitance, parasitic capacitance, etc. Herein, "AC ground" refers to an electrical connection to ground which has negligible impedance at the frequency of the tuning fork resonant mode. The dashed lines 115 and 125 in FIG. 1C denote the capacitances $C_{pm}$ coupling the respective proof mass 110 and 120 to AC ground. The capacitances represented by $C_{pm}$ include electrodes of various geometrical shapes, such as flat plates on the substrate or interdigitated comb fingers adjacent to the proof masses.

The sense charge amplifier 130 is configured to receive an input provided from the electrical-resistance mid-point 171, which is a point on the stationary electrical connection 170. As shown in FIG. 1C, the electrical-resistance mid-point 171 of the stationary electrical connection 170 is the midpoint between the first ends 111 and 121 the second ends 112 and 122 of the respective first and second proof masses 110 and 112. The sense charge amplifier 130 generates an output signal $V_{out}$ indicative of the tuning fork resonant mode. The sense charge amplifier 130 provides a virtual ground at its input 156. The virtual ground is thus provided to the electrical-resistance mid-point 171 of the stationary electrical connection 170 that connects first mid-point stationary anchor 145 and second mid-point stationary anchor 144.

No voltage, responsive to the magnetic field gradient $dB_z/dx$, is generated at the electrical-resistance mid-point 171 of the stationary electrical connection 170 when the first proof mass 110 and the second proof mass 120 move in an oscillatory motion with opposing velocities (e.g., $-V_x$ and $+V_x$) along the motor axis X in the presence of a magnetic field gradient $dB_z/dx$ along the motor axis X. The output signal $V_{out}$ is independent of the magnetic field gradient $dB_z/dx$.

The Lorentz force on free charges in the moving proof masses 110 and 120 produces a charge separation in each proof mass 110. The charge separation in the proof mass 110 due to Lorentz forces on the charge carriers is shown in FIG. 2. The charge separation oscillates in sign, due to the oscillatory velocity of the proof masses 110 and 120 in the magnetic field $B_z$, which is shown as $B_1$ and $B_2$ in FIG. 1C. The sense charge amplifier 130 provides a virtual ground at its input, so that the connected ends 111, 112 of the proof mass 110 and the connected ends 121, 122 of the proof mass 120 are at nearly virtual ground. There is resistance $R_1$, $R_2$, and $R_3$ (FIG. 2) in the connection 156 between sense charge amplifier 130 and proof masses 110 and 120, but this resistance is small, so it typically produces a negligible deviation from virtual ground. $R_2$ and $R_3$ are substantially equal, so that the voltage $V_{out}$ produced by the magnetic field gradient $dB/dx$ is negligible.

If only one end of the proof masses were connected to the virtual ground (as in prior art tuning fork gyroscope 5 shown in FIG. 8), the AC voltage with respect to ground averaged over the length $L_y$ (FIGS. 1C and 8) of the proof masses, would be non-zero. In prior art tuning fork gyroscope 5, this AC voltage produces a net current in the capacitance $C_{pm}$ between proof masses 10 and 20 and AC ground. This current flows into the sense charge amplifier 30, producing the output signal $V_{out}$. The emf across the Y axis length $L_y$ of one proof mass 10 produced by the motion of the proof mass 10 along the X axis in the presence of a magnetic field along the Z-axis is given by $$V_{emf} = V_x B_z L_y, \quad (1)$$

where $v_x$ is the X axis velocity of the proof mass 10, $B_z$ is the Z-axis magnetic field experienced by the proof mass 10, and $L_y$ is the Y-axis length of the proof mass 10. Because the two proof masses 10 and 20 are moving in opposite directions, a uniform magnetic field does not produce a net current at the sense charge amplifier 30 (at least in this simple model).

Since the prior art tuning fork gyroscope 5 (FIG. 8) does not include an electrical-resistance mid-point 171 and the input of the sense charge amplifier 30 is connected to the anchor 45, an X-axis gradient in the magnetic field $B_z$ produces an output signal. For the prior art tuning fork gyroscope 5, the voltage output at the sense charge amplifier 30 (assuming the lumped parameter approximation in the circuit of FIG. 2) is given by:

$$V_{out} \cong 2\omega_{mot} x_0 \frac{dB_z}{dx} \Delta x L_y \frac{C_{pm}}{C_f} \quad (2)$$

where $\omega_{mot}$ is the motor frequency of motion of the proof masses, $x_0$ is the amplitude of motor travel of the proof masses, $dB_z/dx$ is the gradient of magnetic field, $\Delta x$ is the distance between the center of the gyro and the center of one of the proof masses, $L_y$ is the length of the proof masses in the y-direction, $C_{pm}$ is the capacitance to AC ground on one proof mass, and $C_f$ is the feedback capacitance in the sense charge amplifier.

However, since the sense charge amplifier 130 of FIG. 1C is configured to receive input provided from the electrical-resistance mid-point 171 of the stationary electrical connection 170 and since $R_2 \cong R_3$, the current at the input of the sense charge amplifier 130 consists of approximately equal and opposite sign contributions from each side of the proof mass 110 or 120. Thus, the current at the input of the sense charge amplifier 130 is approximately zero, and the magnetic field gradient $dB_z/dx$ does not produce an output signal $V_{out}$ in the tuning fork MEMS gyroscope 100.

Figure 3:
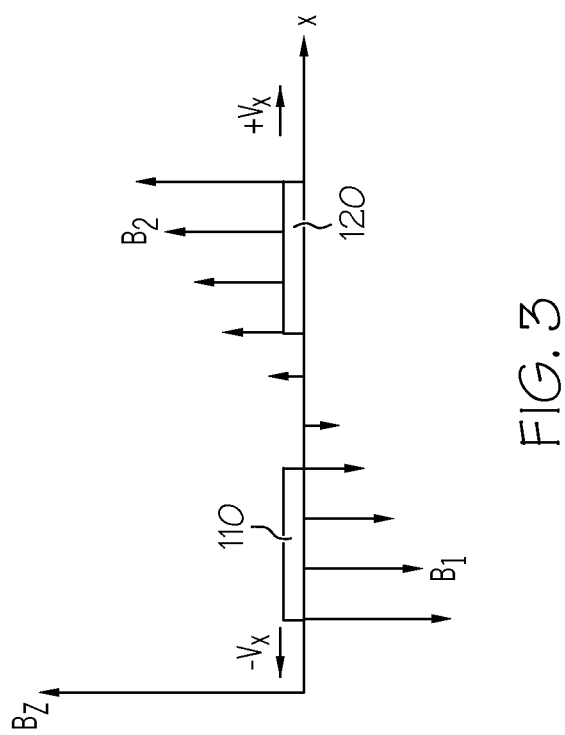
FIG. 3 is a side view of one embodiment of proof masses in an exemplary magnetic field gradient.

FIG. 3 is a side view of one embodiment of the proof masses 110 and 120 in an exemplary magnetic field gradient $dB_z/dx$. The Z-component of magnetic field is varying as a function of X. Thus, the magnetic field has a gradient along the motor axis (X-axis) of the proof masses 110 and 120 in the exemplary tuning fork MEMS gyroscope 100. The amplitudes of magnetic field $B_z$ are shown as $B_1$ (approximately centered in the first proof mass 110 in the negative Z direction) and as $B_2$ (approximately centered in the second proof mass 120 in the positive Z direction) in FIGS. 1C and 3. The exemplary tuning fork MEMS gyroscope 100 is insensitive to any spatially varying magnetic field in which the integral of $B_z$ over the first proof mass 110 is equal and opposite that of the second proof mass 120.

Figure 4:
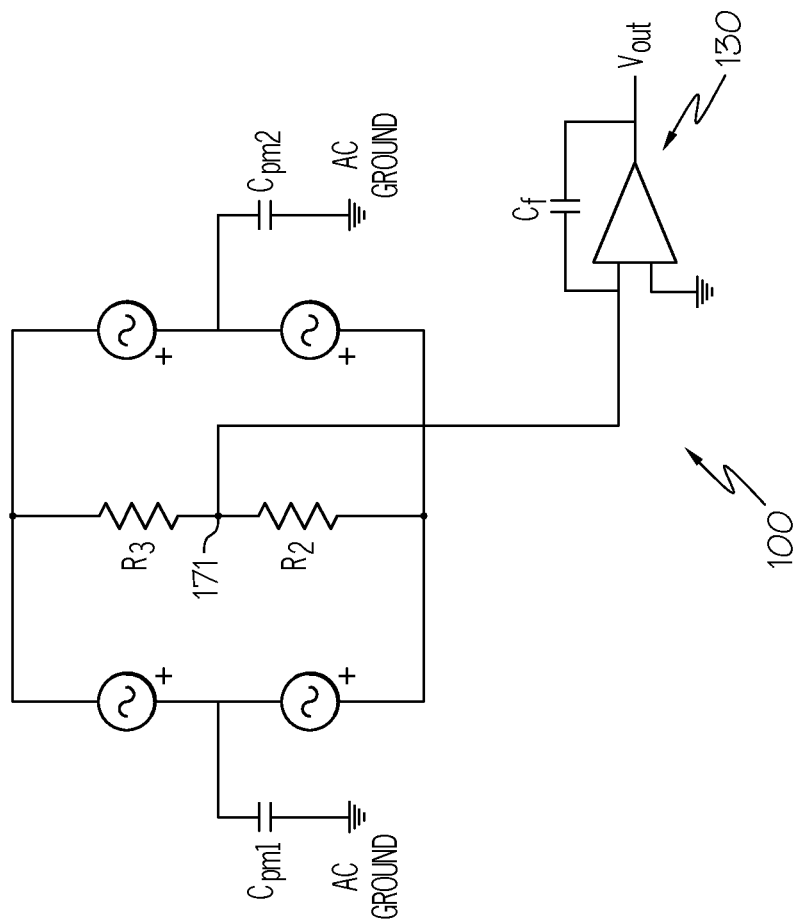
FIG. 4 is an embodiment of a lumped circuit of the tuning fork MEMS gyroscope of FIG. 1C.

FIG. 4 is an embodiment of a lumped circuit of the tuning fork MEMS gyroscope 100 of FIG. 1C. FIG. 4 shows an equivalent circuit for both proof masses 110 and 120 and the sense charge amplifier 130. The distributed capacitance and emf (charge separation) for each of the proof masses 110 and 120 shown in FIGS. 1 and 2 is replaced by a lumped capacitance and two lumped voltage sources in FIG. 4.

The sense charge amplifier 130 is connected at the electrical-resistance mid-point 171, which is a point on the stationary electrical connection 170 formed between the first mid-point stationary anchor 145 and the second mid-point stationary anchor 144, such that there is equal electrical resistance between the electrical-resistance mid-point 171 and the second ends 112 and 122 and first ends 111 and 121 of the proof masses 110 and 120, respectively. At this connection point 171, the voltage produced by the induced emf is zero, due to the symmetry of the gyroscope sensor mechanism 160. The stationary electrical connection 170 is finite in resistance, but low enough that it does not contribute a substantial amount of noise at the sense charge amplifier output $V_{out}$. The desired rotation rate signal from the gyroscope sensor mechanism 160 is not affected by connecting the sense charge amplifier 130 to both the second ends 112 and 122 and first ends 111 and 121 of the proof masses 110 and 120 as shown in FIGS. 1 and 2.

Figure 5:
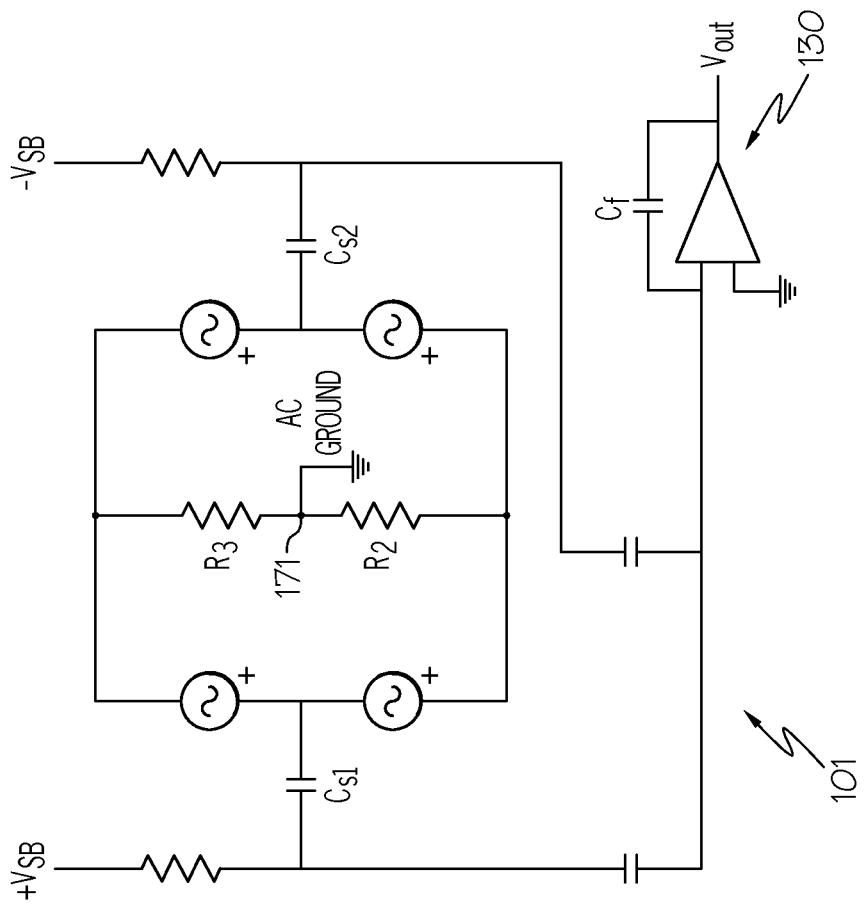
FIG. 5 is an embodiment of a lumped circuit of a tuning fork MEMS gyroscope in accordance with the present invention.
Figure 6:
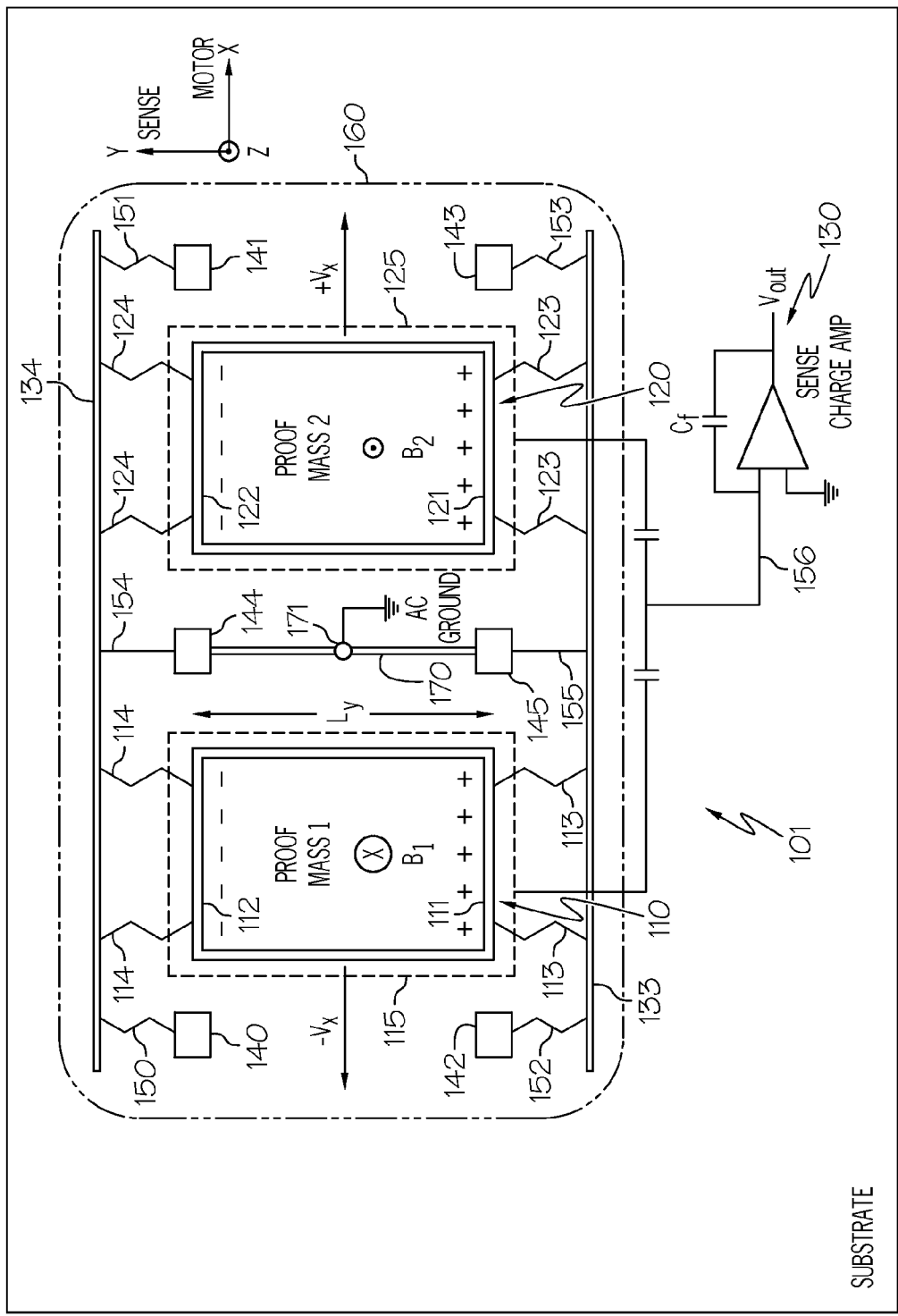
FIG. 6 is a block diagram of the embodiment of tuning fork MEMS gyroscope of FIG. 5.

FIG. 5 is an embodiment of a lumped circuit of a tuning fork MEMS gyroscope 101 in accordance with the present invention. FIG. 6 is a block diagram of the embodiment of tuning fork MEMS gyroscope 101 of FIG. 5. The tuning fork MEMS gyroscope 101 (FIG. 5) is similar to the tuning fork MEMS gyroscope 100 (FIG. 4), except that the sense charge amplifier 130 is connected to the sense capacitance electrodes 115 and 125 rather than the respective proof masses 110 and 120, and the electrical-resistance mid-point 171 of the stationary electrical connection 170 is connected to AC ground. The tuning fork MEMS gyroscope 101 includes bias voltages $+V_{SB}$ and $-V_{SB}$ applied to respective capacitances $C_{S1}$ and $C_{S2}$. The sense capacitances $C_{S1}$ and $C_{S2}$ form a portion of the capacitance $C_{pm}$ shown in FIG. 2 for the tuning fork MEMS gyroscope 100.

The proof masses 110 and 120 are connected to AC ground at the node between resistors $R_2$ and $R_3$, which are substantially equal. By connecting the proof masses 110 and 120 to AC ground in the tuning fork MEMS gyroscope 101, zero (0) current is produced in the sense capacitances $C_{s1}$ and $C_{s2}$ when the proof masses 110 and 120 move through a magnetic field gradient. Hence, a magnetic field gradient produces zero (0) current at the sense charge amplifier input.

With the biasing $\pm V_{SB}$ shown in FIG. 5, differential sense-axis oscillatory motion of the proof masses 110 and 120 produced by rotation of the gyroscope sensor mechanism 160 produces a non-zero AC current at the input to the sense charge amplifier 130.

The tuning fork MEMS gyroscope 101 shows proof masses 110 and 120 moving in motor mode along the X axis with opposing velocities $+v_x$ and $-v_x$ in the presence of a magnetic field gradient $dB_z/dx$ (FIG. 6). If a permeable magnetic material is near the MEMS gyroscope 101, or within the gyroscope package, as described above, a uniform applied magnetic field can magnetize the permeable material, which then produces a magnetic field gradient at the MEMS gyroscope sensor 101. Alternatively, remnant magnetization in the permeable material can produce a magnetic field gradient at the MEMS gyroscope sensor 101. The tuning fork MEMS gyroscope 101 is insensitive to the magnetic field gradient $dB_z/dx$.

Figure 7:
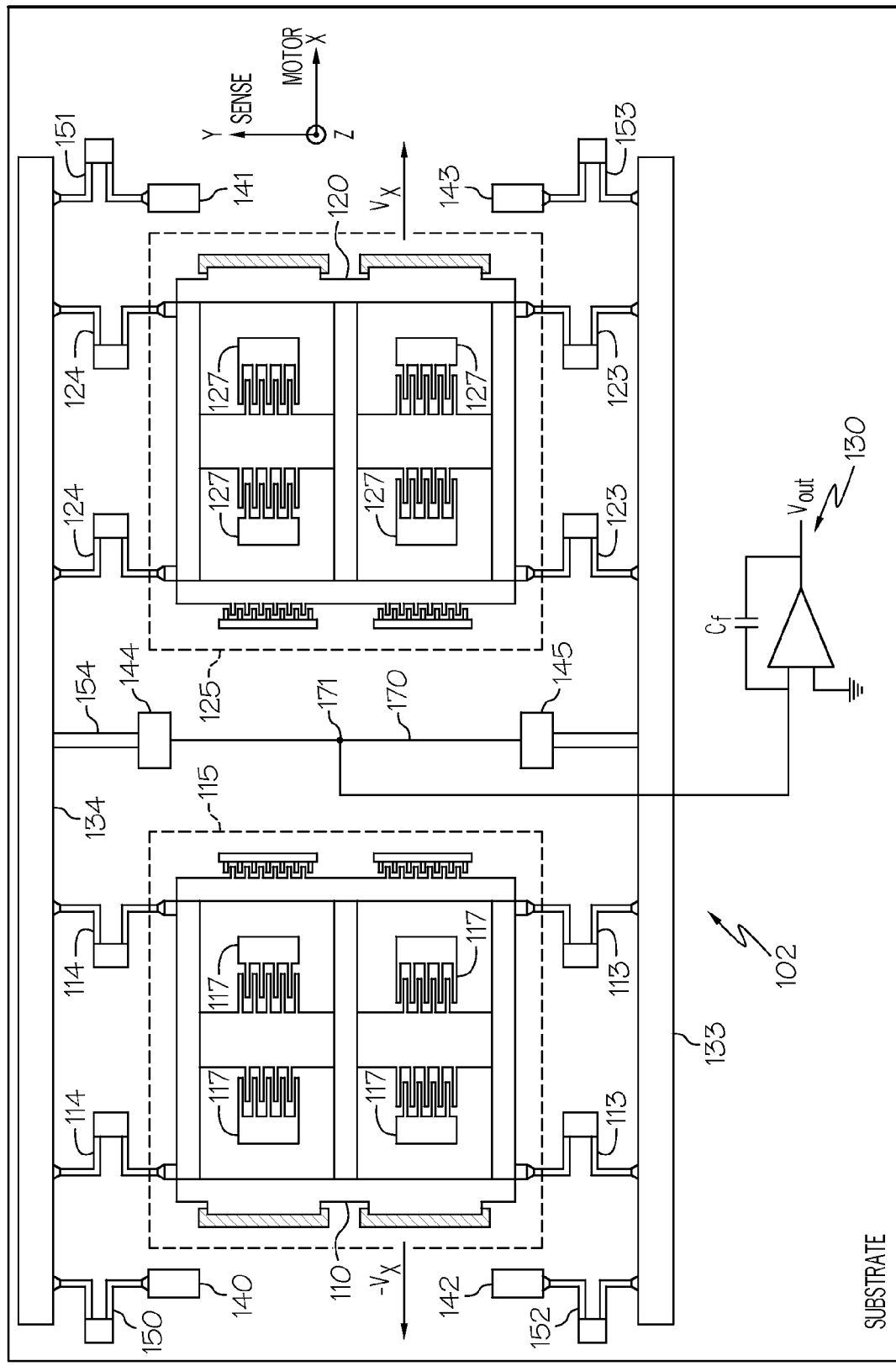
FIG. 7 is a block diagram of an embodiment of an out-of-plane tuning fork MEMS gyroscope having an electrical-resistance mid-point in accordance with the present invention.

The tuning fork MEMS gyroscopes 100 and 101 are in-plane tuning fork MEMS gyroscopes 100 and 101, which measure rotation about an axis parallel to the planes of the one or more insulating substrates 129. FIG. 7 is a block diagram of an embodiment of an out-of-plane tuning fork MEMS gyroscope 102, which measures rotation about an axis perpendicular to the planes of the one or more insulating substrates 129. The out-of-plane tuning fork MEMS gyroscope 102 has an electrical-resistance mid-point 171 in accordance with the present invention. The proof masses 110 and 120 in the out-of-plane tuning fork MEMS gyroscope 102 differ in shape from the proof masses 110 and 120 in the tuning fork MEMS gyroscopes 100 and 101. The capacitance electrodes 115 and 125 in the out-of-plane tuning fork MEMS gyroscope 102 reside on the one or more substrates 129, and are connected to DC ground, which is not shown in FIG. 7. The sense capacitance electrodes 117 and 127 are interdigitated comb fingers formed from the same conducting material as the proof masses 110 and 120, and are connected to AC ground, through sense bias voltages $+V_{SB}$ and $-V_{SB}$, which are not shown in FIG. 7. In one implementation of this embodiment, out-of-plane tuning fork MEMS gyroscope 102 is configured with the electrical-resistance mid-point 171 connected to AC ground and an input of the sense charge amplifier 130 is connected to the sense capacitance electrodes 117 and 127, in a manner similar to the connections shown in FIG. 5.

Figure 9:
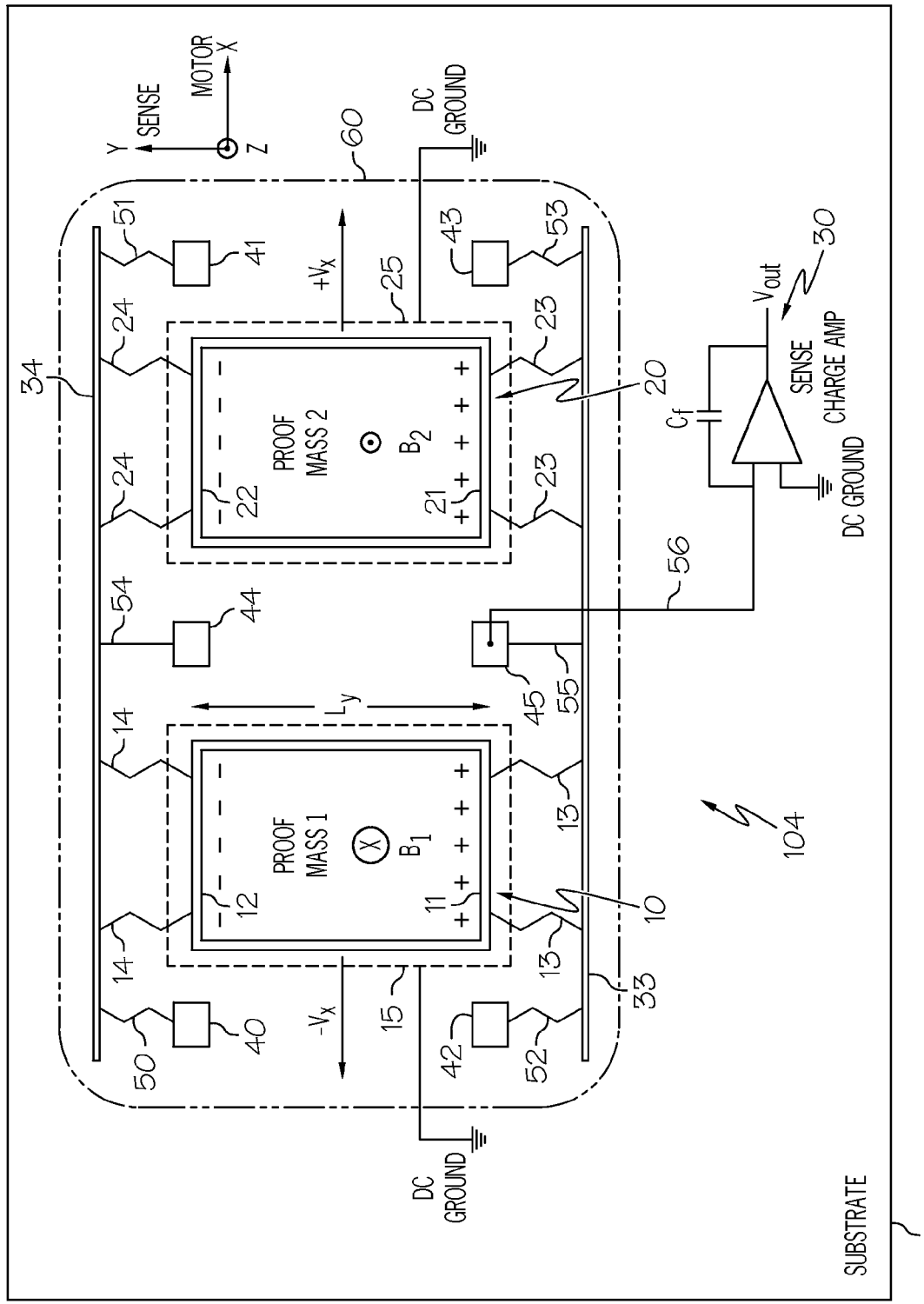
FIG. 9 is a block diagram of an embodiment of a magnetic gradiometer in accordance with the present invention.

FIG. 9 is a block diagram of an embodiment of a magnetic gradiometer 104 in accordance with the present invention. The magnetic gradiometer 104 includes a first electrically conducting proof mass 10, a second electrically conducting proof mass 20 and a sense charge amplifier 30. The first electrically conducting proof mass 10 is connected through electrically conducting suspensions 13, 14, 33, and 34 to anchors 40-45 attached to one or more insulating substrates 29. The second electrically conducting proof mass is connected through electrically conducting suspensions 23, 24, 33, and 34 to anchors 40-45 attached to the one or more insulating substrates 29. The two conductive proof masses 10 and 20, the proof-mass suspensions 13, 14, 23, 24, and suspension bars 133 and 134, and the anchor-suspensions 150, 151, 152, 153, 54, 55 and the insulating substrate 29 beneath the two conductive proof masses 10 and 20 are collectively referred to herein as the magnetic gradiometer sensor mechanism 60, which is driven into motion along a motor axis X at the frequency of the tuning fork resonant mode (motor mode).

The first and second proof masses 10 and 20 are capacitively coupled to DC ground. The sense charge amplifier 30 is configured to receive a first input from one of the anchors (e.g., anchor 45) and a second input from DC ground. If the first electrically conducting proof mass and the second electrically conducting proof mass are exposed to a magnetic field gradient, the sense charge amplifier 30 generates an output signal indicative of the magnetic field gradient. If the first electrically conducting proof mass and the second electrically conducting proof mass are subjected to acceleration or rotation, the sense charge amplifier 30 does not generate an output signal indicative of the acceleration or rotation.

The anchors and suspensions of the magnetic gradiometer 104 are similar in configuration to the anchors and suspensions of the prior art tuning fork gyroscope 5 (FIG. 8). Since the proof mass 10 and proof mass 20 in the magnetic gradiometer 104 are capacitively coupled to DC ground via the sense capacitance electrodes 15 and 25, the bias voltage that allows the prior art tuning fork gyroscope 5 to sense rotational force is removed. By increasing the multiplier $$2\omega_{mot}x_0 \Delta x L_y \frac{C_{pm}}{C_f}$$

of $dB_z/dx$ in equation (2), the output $V_{out}$ from the sense charge amplifier increases. The geometric form of the proof masses 10 and 20 in the magnetic gradiometer 104 can be adjusted to increase $L_y$, thereby increasing the multiplier. As the capacitance $C_{pm}$ to DC ground increases, the sensitivity of magnetic gradiometer 104 increases. As the distance $\Delta x$ between the center of each proof mass and the center of the magnetic gradiometer 60 increases, the sensitivity of magnetic gradiometer 104 increases. As $x_o$, the amplitude of motor travel of the proof masses, increases, the sensitivity of magnetic gradiometer 104 increases. As $\omega_{mot}$, the motor frequency of motion of the proof masses, increases, the sensitivity of magnetic gradiometer 104 increases. The magnetic gradiometer 104 does not require an applied bias current to flow in order to detect a magnetic gradient $dB_z/dx$.

Figure 10:
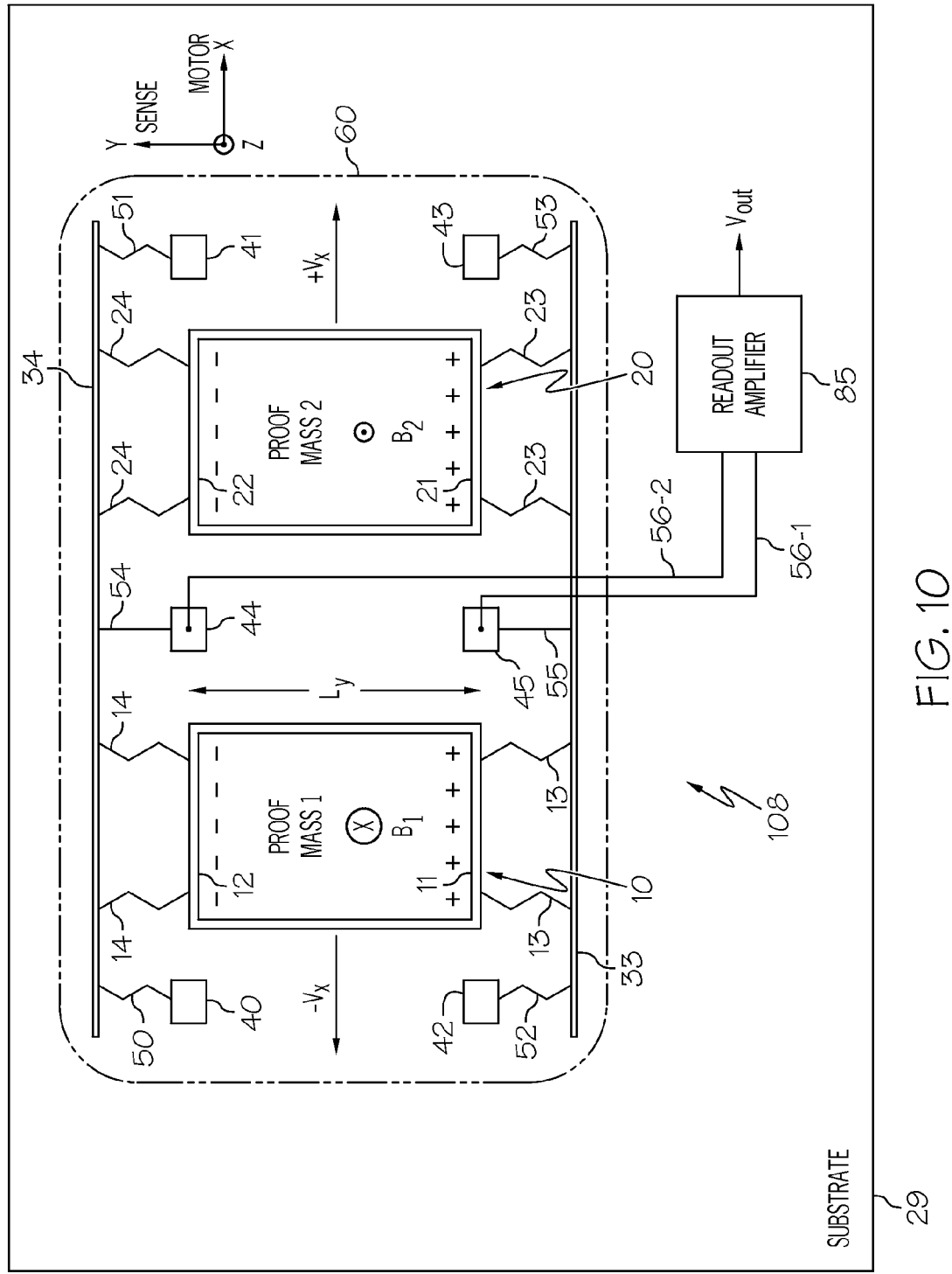
FIG. 10 is a block diagram of an embodiment of a magnetic gradiometer in accordance with the present invention.

FIG. 10 is a block diagram of an embodiment of a magnetic gradiometer 108 in accordance with the present invention. The magnetic gradiometer 108 includes a first electrically conducting proof mass 10, a second electrically conducting proof mass 20 and a readout amplifier 85. The first electrically conducting proof mass 10 is connected through electrically conducting suspensions 13, 14, 33, and 34 to anchors 40-45 attached to one or more insulating substrates 29. The second electrically conducting proof mass is connected through electrically conducting suspensions 23, 24, 33, and 34 to anchors 40-45 attached to the one or more insulating substrates 29. The two conductive proof masses 10 and 20, the proof-mass suspensions 13, 14, 23, 24, and suspension bars 133 and 134, and the anchor-suspensions 150, 151, 152, 153, 54, 55 and the insulating substrate 29 beneath the two conductive proof masses 10 and 20 are collectively referred to herein as the magnetic gradiometer sensor mechanism 60, which is driven into motion along a motor axis X at the frequency of the tuning fork resonant mode (motor mode). Capacitive coupling between the proof masses and ground has a negligible effect on the operation of magnetic gradiometer 108, for the values of capacitive coupling typically encountered in a MEMS tuning fork resonant sensor such as magnetic gradiometer 108.

The readout amplifier 85 is configured to receive a first input from a first mid-point stationary anchor 45 and a second input a second mid-point stationary anchor 44. Thus, the readout amplifier 85 is connected to read the difference in voltage between the first mid-point stationary anchor 45 and the second mid-point stationary anchor 44. In this way, the output voltage $V_{out}$ directly measures the induced emf between the first end 11 and the second end 12 of the conductive proof mass 10. Similarly, the output voltage $V_{out}$ directly measures the induced emf between the first end 21 and the second end 22 of the conductive proof mass 20. The capacitances do not provide a return path for the current. This magnetic gradiometer 108 provides a higher sensitivity to magnetic field gradients than the magnetic gradiometer 104.

If the first electrically conducting proof mass 10 and the second electrically conducting proof mass 20 are exposed to a magnetic field gradient, the readout amplifier 85 generates an output signal $V_{out}$ indicative of the magnetic field gradient. If the first electrically conducting proof mass 10 and the second electrically conducting proof mass 20 are subjected to acceleration or rotation, the readout amplifier 85 does not generate an output signal indicative of the acceleration or rotation.

The anchors and suspensions of the magnetic gradiometer 108 are similar in configuration to the anchors and suspensions of the magnetic gradiometer 104 (FIG. 9). The magnetic gradiometer 108 can be configured to maximize sensitivity as described above with reference to the magnetic gradiometer 104. The magnetic gradiometer 108 does not require an applied bias current to flow in order to detect a magnetic gradient $dB_z/dx$.

Figure 11:
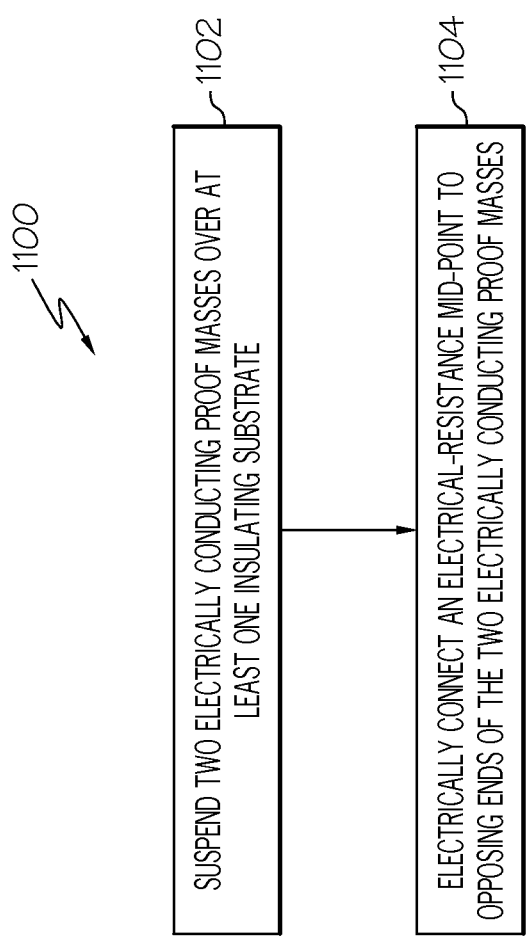
FIG. 11 is a flow diagram of an embodiment of a method to reduce or eliminate bias in an output of a tuning fork gyroscope in the presence of a magnetic field gradient in accordance with the present invention.

FIG. 11 is a flow diagram of an embodiment of a method 1000 to reduce or eliminate bias in an output of a tuning fork gyroscope in the presence of a magnetic field gradient in accordance with the present invention. The tuning fork gyroscope can be the tuning fork gyroscopes 100, 101 or 102 of FIG. 1, 6, or 7, respectively.

At block 1102, two electrically conducting proof masses are suspended over at least one insulating substrate. At block 1104, an electrical-resistance mid-point is electrically connected to opposing ends of the two electrically conducting proof masses. The electrical resistances of the connections from the opposing ends of the two electrically conducting proof masses are equal at the electrical-resistance mid-point. A sense charge amplifier 130 connected to the tuning fork gyroscope generates an output signal indicative of a rotation of the tuning fork gyroscope. The output signal generated at the output of the tuning fork gyroscope is independent of a magnetic field gradient experienced by the tuning fork gyroscope. In this manner, the magnetic sensitivity of a tuning fork MEMS gyroscope to a magnetic field gradient dB/dx is substantially reduced or eliminated.

If method 1100 is applied to tuning fork gyroscopes 100 or 102 of FIG. 1C or 7, respectively, then the electrical-resistance mid-point 171 is connected to an input of the sense charge amplifier 130 and a second input of the sense charge amplifier is connected to AC ground while the two electrically conducting proof masses 110 and 120 are capacitively coupled to AC ground.

If method 1100 is applied to tuning fork gyroscope 101 of FIG. 6, then the electrical-resistance mid-point 171 is connected to AC ground, the two electrically conducting proof masses 110 and 120 are capacitively coupled to one or more sense capacitance electrodes 115 and 125 having bias voltages, and an input of the sense charge amplifier 130 is connected to the one or more sense capacitance electrodes 115 and 125.

In one implementation of this embodiment, the stationary electrical connection 170 is a lithographically patterned metal on the substrate 129 of the MEMS gyroscope 100. In another implementation of this embodiment, the stationary electrical connection 170 is formed from the same conducting material as the proof masses 110 and 120. In yet another implementation of this embodiment, the stationary electrical connection 170 is a connection external to the gyroscope sensor mechanism 160. In yet another implementation of this embodiment, the proof masses 110 and 120 are formed from doped silicon. In one implementation of this embodiment, the stationary electrical connection 170 is formed on the insulating substrate 129. In another implementation of this embodiment, a second insulating substrate is positioned above the first and second proof masses 110 and 120. In this latter embodiment, one or more anchors are on the second insulating substrate. In yet another implementation of this embodiment, the electrical-resistance mid-point 171 is formed from the same conducting material as the first electrically conducting proof mass 110 and the second electrically conducting proof mass 120.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A tuning fork gyroscope that is insensitive to magnetic field gradients, the tuning fork gyroscope comprising:
   a first electrically conducting proof mass and a second electrically conducting proof mass connected through electrically conducting suspensions to anchors attached to one or more insulating substrates; and
   an electrical-resistance mid-point electrically connected to opposing ends of the first electrically conducting proof mass and to opposing ends of the second electrically conducting proof mass, the tuning fork gyroscope providing an input to a sense charge amplifier, wherein the electrical resistance of the connections from the opposing ends of the two electrically conducting proof masses are equal at the electrical-resistance mid-point, wherein the sense charge amplifier generates an output signal indicative of a rotation of the tuning fork gyroscope, the output signal being independent of a magnetic field gradient;

wherein the anchors include at least one mid-point stationary anchor and wherein the electrical-resistance mid-point is at a stationary point electrically connected to the at least one mid-point stationary anchor between the first electrically conducting proof mass and the second electrically conducting proof mass, wherein no voltage, due to the magnetic field gradient, is generated at the electrical-resistance mid-point when the proof masses move in an oscillatory motion with opposing velocities along a motor axis in the presence of the magnetic field gradient.

2. The tuning fork gyroscope of claim 1, wherein the first electrically conducting proof mass and the second electrically conducting proof mass are capacitively coupled to AC ground and the electrical-resistance mid-point is electrically connected to an input of the sense charge amplifier.

3. The tuning fork gyroscope of claim 1, wherein the at least one mid-point stationary anchor includes a first mid-point stationary anchor and a second mid-point stationary anchor, and wherein a stationary electrical connection connects the first mid-point stationary anchor and the second mid-point stationary anchor, and wherein the electrical-resistance mid-point is a point on the stationary electrical connection.

4. The tuning fork gyroscope of claim 3, wherein the electrically conducting suspensions include:
  anchor-suspensions mechanically attached to the anchors and mechanically attached to one of a first suspension bar and a second suspension bar;
  proof-mass suspensions mechanically attached to one of the first proof mass and the second proof mass and mechanically attached to one of the first suspension bar and the second suspension bar, the tuning fork gyroscope further comprising:
  the one or more insulating substrates; and
  the anchors formed on the one or more insulating substrates.

5. The tuning fork gyroscope of claim 4, wherein the anchor suspensions include a first portion of the anchor-suspensions and a second portion of the anchor-suspensions, the tuning fork gyroscope further comprising:
  the first suspension bar mechanically attached to the first portion of the anchor-suspensions; and
  the second suspension bar mechanically attached to the second portion of the anchor-suspensions, the first and second suspension bars located at opposing ends of the proof masses.

6. The tuning fork gyroscope of claim 5, further comprising:
  at least one first proof-mass suspension to mechanically attach a first end of a first proof mass to the first suspension bar;
  at least one second proof-mass suspension to mechanically attach a first end of the second proof mass to the first suspension bar;
  at least one third proof-mass suspension to mechanically attach a second end of the first proof mass to the second suspension bar; and
  at least one fourth proof-mass suspension to mechanically attach a second end of the second proof mass to the second suspension bar.

7. The tuning fork gyroscope of claim 6, further comprising:
  a first mid-point suspension to mechanically attach the first mid-point stationary anchor to the first suspension bar, wherein the stationary electrical connection is electrically connected to the first suspension bar; and
  a second mid-point suspension to mechanically attach the second mid-point stationary anchor to the second suspension bar, wherein the stationary electrical connection is electrically connected to the second suspension bar, wherein the first electrically conducting proof mass and the second electrically conducting proof mass are suspended over the one or more insulating substrates via the anchor-suspensions, the first and second suspension bars, and the proof-mass suspensions.

8. The tuning fork gyroscope of claim 1, where the first electrically conducting proof mass and the second electrically conducting proof mass are capacitively coupled to one or more sense capacitance electrodes having bias voltages.

9. The tuning fork gyroscope of claim 8, wherein an input of the sense charge amplifier is connected to the one or more sense capacitance electrodes having bias voltages, and wherein the electrical-resistance mid-point is connected to AC ground.

10. The tuning fork gyroscope of claim 1, wherein the gyroscope sensor mechanism includes the first and second electrically conducting proof masses, proof-mass suspensions, a first suspension bar, a second suspension bar, and anchor-suspensions.

11. The tuning fork gyroscope of claim 1, wherein the tuning fork gyroscope is one of an out-of-plane tuning fork gyroscope or an in-plane tuning fork gyroscope.

12. The tuning fork gyroscope of claim 1, wherein the electrical-resistance mid-point is formed from the same conducting material as the first electrically conducting proof mass and the second electrically conducting proof mass.

13. The tuning fork gyroscope of claim 1, wherein the tuning fork gyroscope is a tuning fork micro-electrical-mechanical system (MEMS) gyroscope.

14. The tuning fork gyroscope of claim 1, wherein the electrical-resistance mid-point is formed from a conducting material lithographically patterned on the one or more insulating substrates.

15. A method to reduce bias in an output of a tuning fork gyroscope in the presence of a magnetic field gradient, the method comprising:
  suspending two electrically conducting proof masses over at least one insulating substrate; and
  electrically connecting an electrical-resistance mid-point to opposing ends of the two electrically conducting proof masses, wherein the electrical resistance of the connections from the opposing ends of the two electrically conducting proof masses are equal at the electrical-resistance mid-point, wherein a sense charge amplifier connected to the tuning fork gyroscope generates an output signal indicative of a rotation of the tuning fork gyroscope, the output signal being independent of the magnetic field gradient;
  wherein the two electrically conducting proof masses are connected through electrically conducting suspensions to at least one mid-point stationary anchor and wherein the electrical-resistance mid-point is at a stationary point electrically connected to the at least one mid-point stationary anchor between the first electrically conducting proof mass and the second electrically conducting proof mass, wherein no voltage, due to the magnetic field gradient, is generated at the electrical-resistance mid-point when the proof masses move in an oscillatory motion with opposing velocities along a motor axis in the presence of the magnetic field gradient.

16. The method of claim 15, the method further comprising:
connecting the electrical-resistance mid-point to an input of the sense charge amplifier; and
connecting a second input of the sense charge amplifier to AC ground.

17. The method claim 16, further comprising:
capacitively coupling the two electrically conducting proof masses to the AC ground.

18. The method of claim 15, further comprising
connecting the electrical-resistance mid-point to AC ground.

19. The method of claim 18, further comprising:
capacitively coupling the two electrically conducting proof masses to one or more sense capacitance electrodes having bias voltages; and
connecting an input of the sense charge amplifier to the one or more sense capacitance electrodes.

20. A tuning fork gyroscope that is insensitive to magnetic field gradients, the tuning fork gyroscope comprising:
means to suspend a first conductive proof mass and a second conductive proof mass over at least one insulating substrate;
means to couple the first conductive proof mass and the second conductive proof mass to AC ground; and
means to generate an output signal indicative of the tuning fork resonant mode, the means to generate being operable to receive an input from an electrical-resistance mid-point of the means to suspend, wherein the generated output signal is unaffected when the first conductive proof mass and the second conductive proof are subjected to a magnetic field gradient;
wherein the means to suspend include at least one mid-point stationary anchor and wherein the electrical-resistance mid-point is at a stationary point electrically connected to the at least one mid-point stationary anchor between the first electrically conducting proof mass and the second electrically conducting proof mass, wherein no voltage, due to the magnetic field gradient, is generated at the electrical-resistance mid-point when the proof masses move in an oscillatory motion with opposing velocities along a motor axis in the presence of the magnetic field gradient.

21. A magnetic gradiometer comprising:
a first electrically conducting proof mass connected through electrically conducting suspensions to anchors attached to one or more insulating substrates;
a second electrically conducting proof mass connected through electrically conducting suspensions to the anchors attached to the one or more insulating substrates, wherein the first electrically conducting proof mass and the second electrically conducting proof mass are capacitively coupled to DC ground and are driven to move in an oscillatory motion with opposing velocities along a motor axis; and
a sense charge amplifier configured to receive a first input from one of the anchors and to receive a second input from DC ground, wherein the sense charge amplifier generates an output signal indicative of a magnetic field gradient to which the first electrically conducting proof mass and the second electrically conducting proof mass are exposed.

22. A magnetic gradiometer comprising:
a first electrically conducting proof mass and a second electrically conducting proof mass driven to move in an oscillatory motion with opposing velocities along a motor axis;
a first end of the first electrically conducting proof mass connected through electrically conducting suspensions to a first anchor attached to an insulating substrate;
a first end of the second electrically conducting proof mass connected through electrically conducting suspensions to the first anchor;
a second end of the first electrically conducting proof mass connected through electrically conducting suspensions to a second anchor attached to the insulating substrate;
a second end of the second electrically conducting proof mass connected through electrically conducting suspensions to the second anchor; and
a readout amplifier configured to receive a first input from the first anchor and to receive a second input from the second anchor, wherein the sense charge amplifier generates an output signal indicative of a magnetic field gradient to which the first electrically conducting proof mass and the second electrically conducting proof mass are exposed.

* * * * *